April 7, 1959
F. M. WILSON
2,880,558
PALLET LOADING DEVICE
Filed Sept. 22, 1955
4 Sheets-Sheet 1
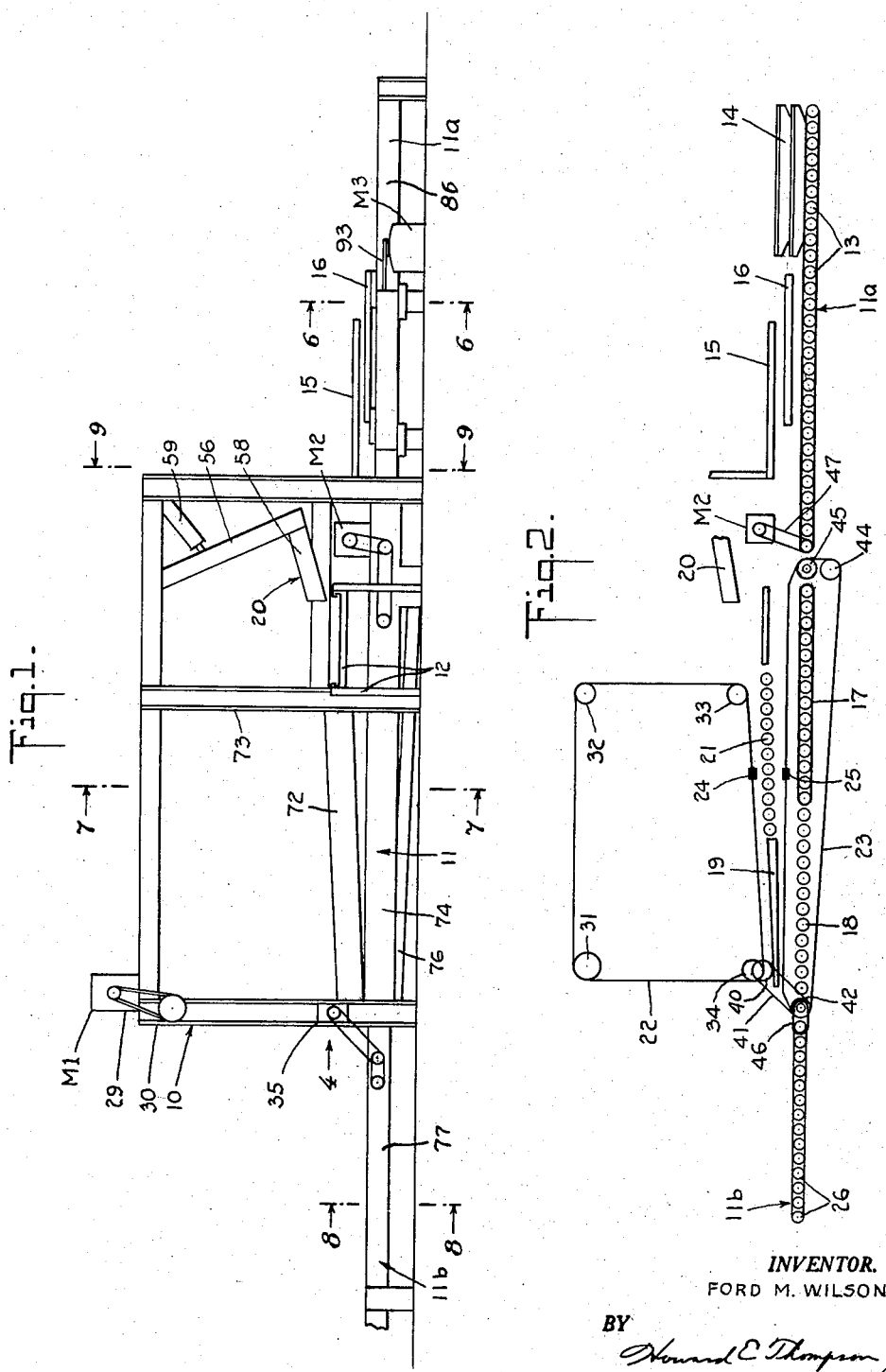
INVENTOR.
FORD M. WILSON
BY
ATTORNEY

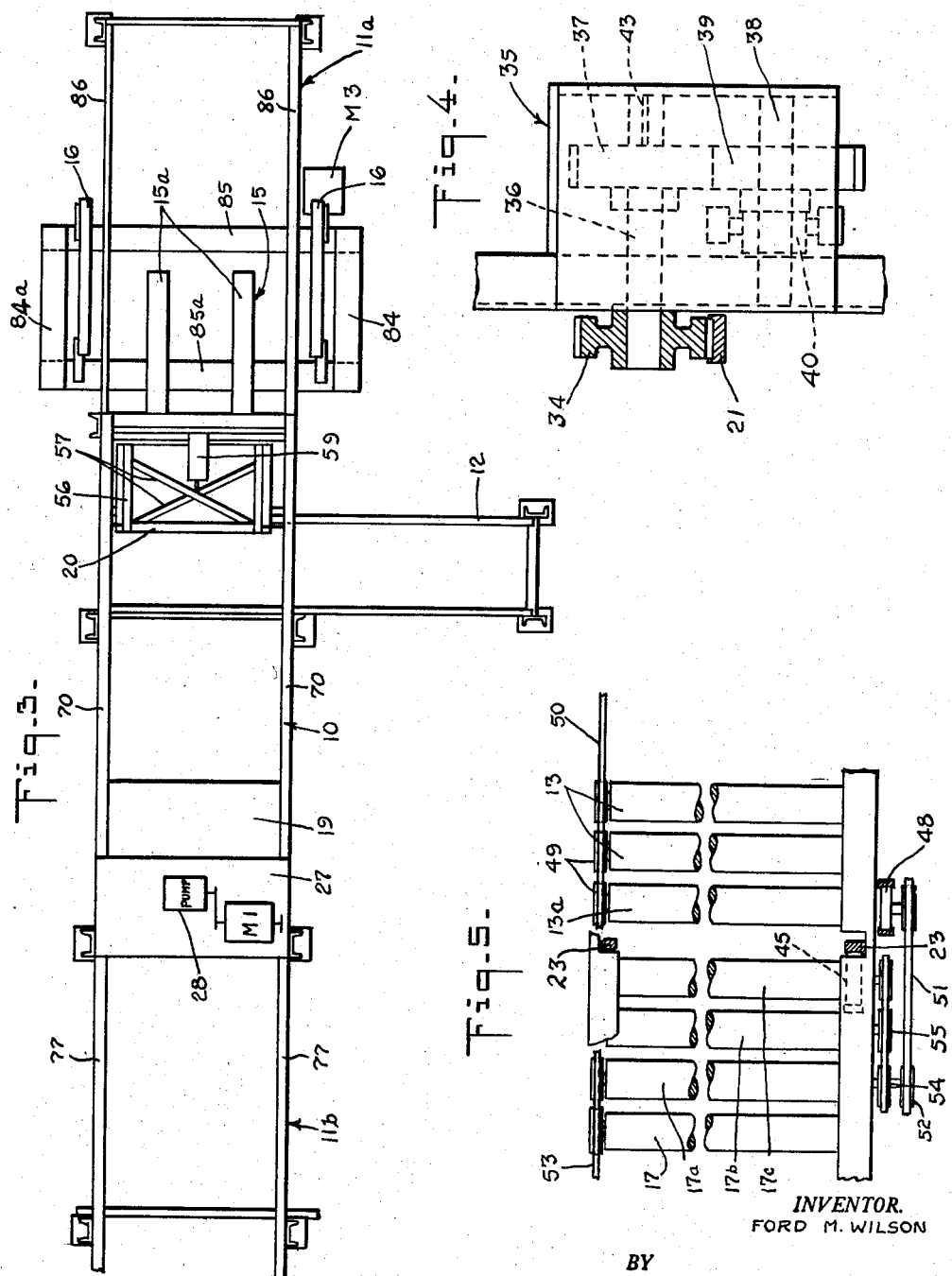

April 7, 1959    F. M. WILSON    2,880,558
PALLET LOADING DEVICE
Filed Sept. 22, 1955    4 Sheets-Sheet 3
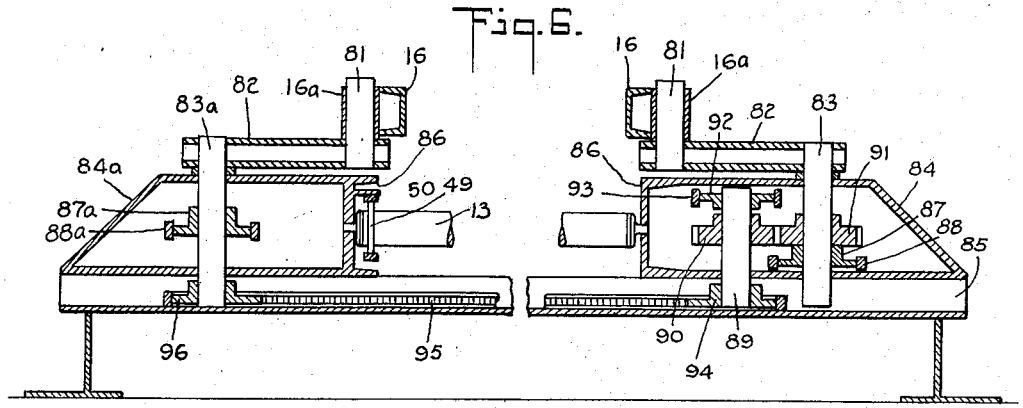
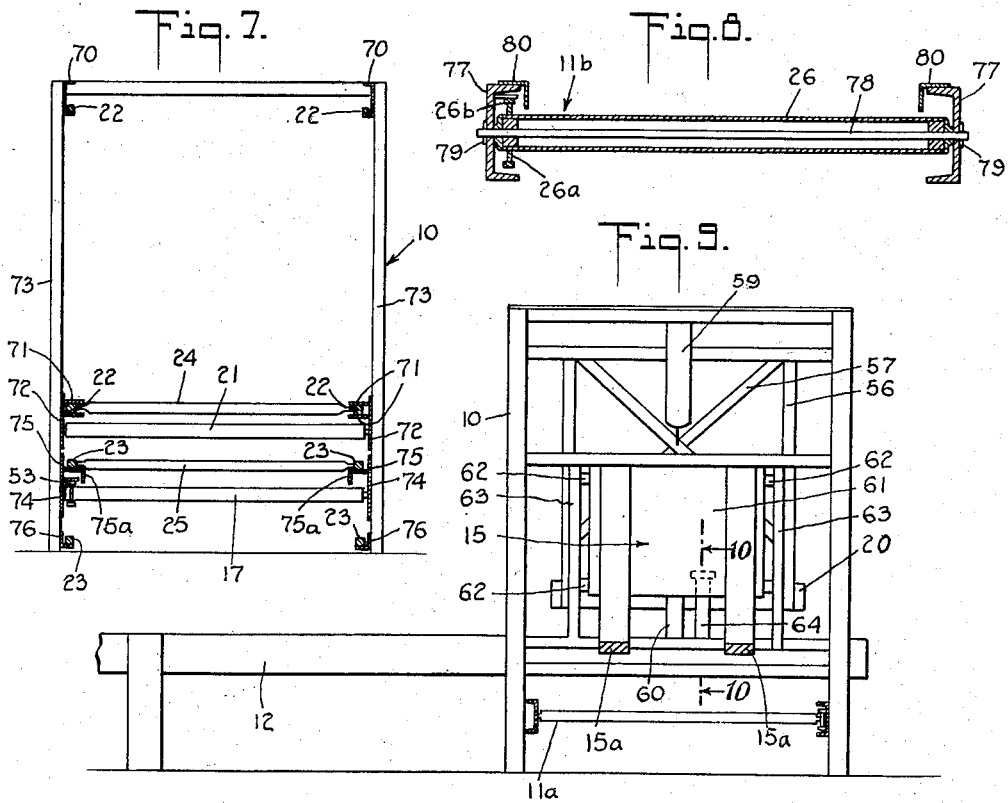
INVENTOR.
FORD M. WILSON
BY
*Howard E. Thompson Jr*
ATTORNEY April 7, 1959  F. M. WILSON  2,880,558
PALLET LOADING DEVICE
Filed Sept. 22, 1955  4 Sheets-Sheet 4
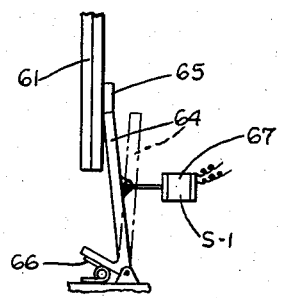
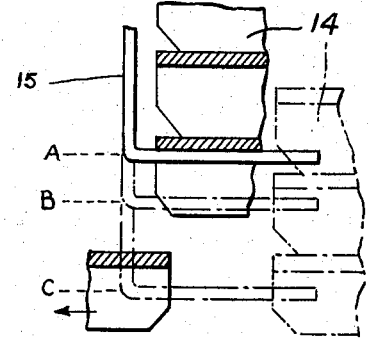
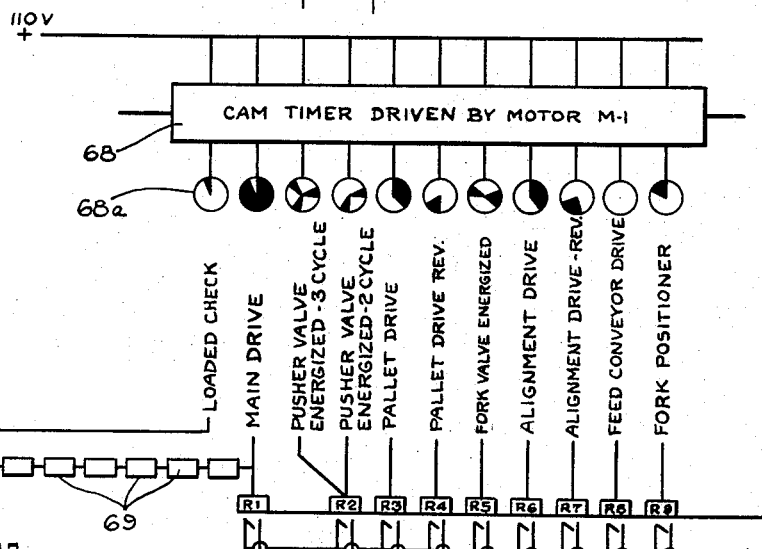
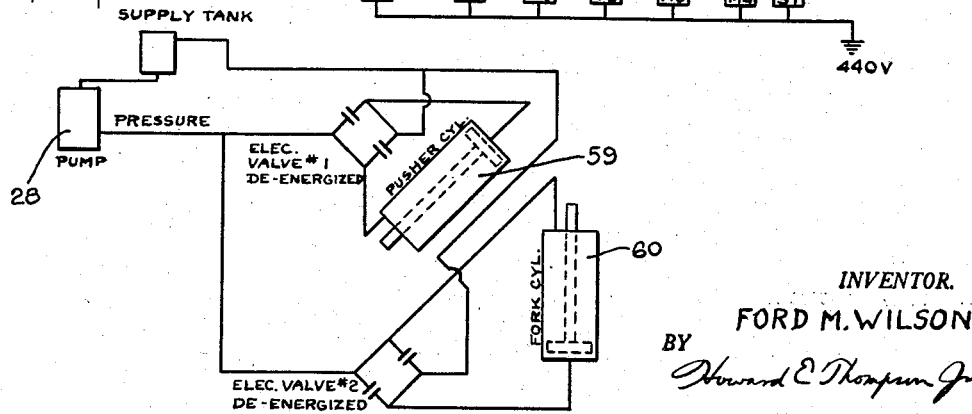
INVENTOR.
FORD M. WILSON
BY
ATTORNEY.

United States Patent Office 2,880,558
Patented Apr. 7, 1959

2,880,558

PALLET LOADING DEVICE

Ford M. Wilson, Staten Island, N.Y.

Application September 22, 1955, Serial No. 535,926

12 Claims. (Cl. 53—35)

This invention relates to a method and apparatus for the automatic loading of pallets or similar mounting members utilized in the handling of heavy and/or bulky articles. More particularly, the invention relates to an automatic apparatus for individually feeding pallets to a loading station simultaneously with the automatic feed of predetermined articles to such loading station and collectively advancing the pallet and assembled articles from the loading station in a manner to gradually lower the articles onto the pallet while readying the next successive pallet for delivery to such loading station.

In the handling of merchandise such as cartons, drums, machinery, stacked sheet material and other heavy and/or bulky articles, the widespread and growing use of self-propelled lift-trucks and the like in moving such articles about has made it the common practice to load such articles on pallets or transfer members, which in their simplest form, comprise an elevated platform supported on runners, spaced apart to permit entry of the fork of a lift-truck and the like. The initial loading of such pallets, however, presents a serious problem in many industries. The size and weight of articles to be loaded makes the hand loading of pallets impossible or impractical in most instances. On the other hand, the mechanized loading of pallets with equipment heretofore available has been rather awkward, or if efficient, has been needlessly costly.

An object of my invention is to provide an automatic pallet loading device which is adapted for use in conjunction with many types of conveyor lines and for the handling of many types of articles to be loaded and which though simple and practical in construction and economical to operate, can assure the balanced loading of a wide variety of articles. A further object being to provide an apparatus of the class described in which the pallets successively fed to a loading station are automatically oriented with respect thereto, wherein goods to be loaded are individually or collectively fed to the loading station during delivery of the pallet thereto, and wherein the means for collectively advancing the assembled articles and pallet from the loading station to superimposed position includes adjustable features facilitating proper orientation of the goods on the pallet.

These and other objects of the invention will be more readily apparent from a consideration of the following description, together with the accompanying drawing illustrating a preferred adaptation of my invention in which the various parts thereof are identified by suitable reference characters in each of the views and in which:

Fig. 1 is a side elevation view of my pallet loading apparatus;

Fig. 2 is a schematic view of the upper and lower chain systems, roller systems, and other movable parts of the apparatus;

Fig. 3 is a plan view of the apparatus as shown in Fig. 1 with conveyor rollers omitted for the sake of clarity;

Fig. 4 is an enlarged view looking in the direction of the arrow 4 in Fig. 1 showing details of the drive between upper and lower chain systems of the apparatus;

Fig. 5 is a plan view of a portion of the lower system as shown in Fig. 2;

Fig. 6 is a sectional view of the pallet aligning mechanism taken substantially on the line 6—6 of Fig. 1;

Fig. 7 is a sectional view taken substantially on the line 7—7 of Fig. 1;

Fig. 8 is a sectional view taken substantially on the line 8—8 of Fig. 1;

Fig. 9 is a partial sectional view substantially on the line 9—9 of Fig. 1 showing particularly an end view of the fork lift mechanism and pusher mechanism;

Fig. 10 is a fragmentary view taken substantially on the line 10—10 of Fig. 9 showing details of the fork positioning means;

Fig. 11 is a schematic view showing different operative positions of the fork lift;

Fig. 12 is a diagrammatic view of the electrical system of the apparatus;

Fig. 13 is a diagrammatic view of the hydraulic system of the apparatus.

My automatic pallet loading apparatus comprises an open-work frame structure suitably fashioned from steel channels, angle-irons and the like and embodying a central super-structure 10 having at the lower portion thereof a pallet roller conveyor 11 which extends beyond opposed ends of said central portion as empty pallet supply conveyor 11a and loaded pallet discharge conveyor 11b. Arranged transversely of and above pallet conveyor 11 is a second conveyor 12 for feeding to the apparatus articles to be palleted.

The rollers 13 in the conveyor 11a are live rollers having a reversible drive for moving pallets 14 with respect to a fork-lift 15 which is mounted for vertical movement in the super-structure 10. During movement of pallets 14 with respect to the fork-lift 15 they pass between rotary reciprocating bars 16 at opposed sides of the conveyor 11a which serve to align the pallets 14 with respect to the conveyor.

From the live rollers 13 a pallet is passed to other live rollers 17 having a one directional drive serving to deliver the pallet to idling rollers 18 disposed beneath a stripper plate 19 which is disposed within the central super-structure or assembly portion of the apparatus.

Articles to be loaded are advanced along conveyor 12 to a position above conveyor 11 and are then advanced by a hydraulically actuated pusher 20 to inclined idling rollers 21 which deliver articles to the upper surface of stripper plate 19 having sufficient friction so that articles will come to rest thereon. The central super-structure 10 is provided with an upper chain system 22 and a lower chain system 23 having synchronized movement and carrying respectively pusher bars 24 and 25 which simultaneously engage articles on the stripper plate 19 and a pallet beneath said stripper plate to advance the same collectively past said stripper plate. The incline of the stripper plate permits the articles and pallet to come into gradual contact so that the articles are pushed on the pallet with a minimum of vibration or jarring as the pallet thus moves from beneath the stripper plate 19 to be picked up by live rollers 26 in conveyor 11b from whence the loaded pallets can be conveyed, stored, or moved in any desired manner.

In order that the mode of operation of the apparatus may be more readily apparent in considering further details of construction, it will be noted that the apparatus includes a main drive motor M–1 mounted on a suitable plate 27 at the top of central super-structure 10. The motor M–1 drives a pump 28 supplying pressure for the hydraulic system hereinafter described and also drives the upper chain system 22 through suitable belt or chain drive 29. As seen in Fig. 1 of the drawing the drive pulley 30 externally of the super-structure 10 is keyed to inner pulleys 31 arranged in opposed sides of the apparatus and carrying the two chains 22 of the upper chain system. The chains 22 pass over idling pulleys 32, 33 and 34, and pulley 34 is keyed to a reversing mechanism 35 for driving the lower chain system 23. The reversing mechanism embodies a shaft 36 carrying pulley 34 and a gear 37 and a second shaft 38 carrying a gear 39 meshing with the gear 37, as well as a pulley 40 connected by suitable belt or chain drive 41 to pulley 42 in the lower chain system. The engagement of the gear 37 with the shaft 36 includes a key-way 43 permitting disengagement of the gears 37 and 39 so that the relative position of pusher bars 24 and 25 can be varied. In this way it is possible to synchronize feed of articles and pallet so that any article or group of articles can be centrally loaded on a pallet.

Chains 23 pass idling pulleys 44 and 45 as the chains 23 and bar 25 supported thereby pass around the conveyor rollers 17 and 18. It will be understood that chains 22 and 23 are of the same length and have the same number of links so that the pusher bars 24 and 25 maintain the same adjusted relationship in repeated cycles of the apparatus, and their drive pulleys such as 31 and 42 are of a sprocketed type having positive engagement with the chain links. Pulleys 32 and 44 are preferably adjustably mounted to permit tensioning of the chains to components for wear and the like. The motor M-1 also drives live rollers 26 through a take-off 46 on pulley 42. This is preferably a slightly increased speed take-off so that the rollers 26 provide a slight pulling action on a pallet being advanced by the pusher bar 24, thus assuring proper disengagement of the pallet from the pusher bar.

A second motor M-2 which is a reversible motor is coupled by means of belt or chain drive 47 to external pulley 48 which in turn is coupled with roller 13a (note Fig. 5). Collective movement of the rollers 13 is provided by sprockets 49 at one end of the rollers and chain 50 passing therearound.

The pulley 48 also has a take-off drive 51 extending to roller 17a in the group of live rollers 17. Roller 17a is provided with a one-way ratchet sprocket 52 so that roller drive chain 53 will move in only one direction. The roller 17a has a sprocket 54 keyed to the end thereof adjacent sprocket 52 for driving chain 55 which in turn engages external sprockets on rollers 17b and 17c. In this way it is possible to provide a positive drive of rollers 17b and 17c without interference with the independent mounting of pulleys 45, co-axially with roller 17c and carrying the lower chains 23 from beneath to above the rollers 17.

A third motor M-3 drives rotary reciprocating bars 16 and is of a reversible type so that the bars 16 rotate in the direction of movement of pallets in the conveyor 11a. A fourth motor M-4 for driving conveyor 12 is not illustrated since this can be any conventional conveyor drive and does not constitute a part of my apparatus except to the extent that control motor M-4 is integrated with control of other motors in the apparatus.

The pusher 20 which embodies a yoke-shaped part 56 with cross-braces 57 and a lower offset 58 to provide clearance for engaging articles of irregular contour is actuated by means of a hydraulic cylinder 59 which swings the pusher 20 about its pivotal mounting in the upper portion of the super-structure 10. The hydraulic cylinder 59 is diagrammatically shown in the deenergized position by virtue of the particular adjustment of the control valve No. 1 (note Fig. 13 of the drawing). A second hydraulic cylinder 60 controlling the fork-lift 15 is also shown in Fig. 13 in the deenergized position by virtue of the adjustment of electrical valve No. 2. It will be noted that hydraulic cylinder 60 is coupled with a mounting plate 61 carrying spaced fork members 15a of the fork-lift. The plate 61 is carried for vertical movement by four sets of guide rollers 62 engaging channel 63 forming part of the super-structure 10.

Energizing of hydraulic cylinder 60 operates to raise the fork-lift 15 to an uppermost position A as diagrammatically shown in Fig. 11. Upon deenergizing the hydraulic cylinder 60, the fork-lift can drop to the lowermost position C as shown in Fig. 11, or if desired, can be stopped at an intermediate position B by means of a stop member 64 (shown in Figs. 9 and 10 of the drawing) which in operative position engages a lug 65 on plate 61 of the fork-lift. The stop member 64 is pivotally mounted as will be seen in Fig. 10 and is normally supported in the dotted line position by means of a spring 66. When it is desired to interrupt downward movement of the fork-lift 15 a solenoid 67 is electrically actuated to swing the stop member 64 in the full line position as shown in Fig. 10.

Having now identified the various moving parts of the apparatus attention is directed to Fig. 12 of the drawing which shows diagrammatically the master control for automatic operation of the apparatus. The cam-timer 68 is driven by motor M-1 at such a rate that it makes one complete revolution in the time required for the pusher bars 24, 25 of the chain systems to make one complete cycle. In the diagrammatic showing 68a of the cam contacts, the darkened portions indicate portions of the complete cycle in which the cam is providing a closed circuit. It will be noted in this connection that no pattern has been shown for the feed conveyor drive, i.e. the motor M-4 (not shown) which drives conveyor 12, since this feed will obviously be variable and adjustable in accordance with the particular type and size of articles being loaded. The operation of the apparatus can be readily visualized if the various cam patterns 68a are considered as rotating collectively in a counter-clockwise direction. It will be noted in this connection that for a brief interval at the end of each cycle and before the beginning of the next cycle control of the main drive motor M-1 is provided through a "loaded check" circuit including a number of switches 69 in series suitably located about the apparatus. The switches 69 can be either of the normally closed or normally open type. By way of illustration a normally closed switch might be provided in conveyor 11b which would be opened to interrupt current to the main drive motor No. 1 only if a loaded pallet remained on conveyor 11b at the end of the cycle. In conveyor 12, one or more normally open switches 69 would be provided which would be closed by the presence of articles to be loaded on conveyor 12. The absence of articles to be loaded on conveyor 12 would then operate to interrupt or break the circuit to the main motor M-1, thus stopping the apparatus. Another normally open switch 69 would suitably be provided on conveyor 11a to stop the apparatus in the event that no pallet 14 was in position to be delivered to the apparatus. It will be recognized of course that the number, type and location of the check-switches 69 would necessarily be varied to suit the particular type of loading to be done by the apparatus.

It will be noted that the cam-timer which is arranged in a 110 volt circuit actuates separate relays which in turn control the various motors, valve and solenoid in a 440 volt circuit. In Fig. 12 of the drawing the designations M-1, M-2 etc. correspond with the designations of motors, valves and solenoids which have previously been described.

In the operation of the apparatus the start of any particular cycle will find a stack of pallets in the position of the pallet 14 as shown in Fig. 2 of the drawing and the fork-lift 15 will be supported in the intermediate position B as shown in Fig. 11. As the stack of pallets is advanced from right to left by the advance drive of motor M-2 the rotary reciprocating bars 16 (rotating in a direction to move with the pallets 14) will straighten and align the two lowermost pallets as they advance toward the fork-lift 15. On continued advance the fork 15 passes between the lowermost and second pallets as seen in Fig. 11 and at which point the fork-lift 15 is energized and elevated to the full line position A as shown in Fig. 11 so that the lowermost pallet 14 alone can be moved onto the lift of the apparatus. During this period there has been one actuation of the pusher 22 to advance articles to be loaded toward stripper plate 19 and the pusher bars 24 and 25 will have completed approximately one-quarter of their full cycle.

When the lowermost pallet 14 has thus cleared the fork-lift 15, valve V-2 and hydraulic cylinder 60 are de-energized permitting the fork-lift 15 to drop to the lowermost position C as shown in Fig. 11. Reverse actuation of the rollers 13 now carry the stack of pallets from left to right while the aligning bars 16 are rotating in a reverse direction to move with the pallets in aligning the same. During this time there may have been a second actuation of pusher 20 to advance articles toward the stripper plate 19. There follows a second actuation of the fork-lift 15 raising it from the lowermost position C to the uppermost position A as shown in Fig. 11 and while it is thus raised the solenoid S-1 identified in Fig. 10 by the numeral 67 is actuated to move the stop member 64 to the full line position. Then when the fork-lift cylinder 60 is deenergized the fork-lift drops only from position A to position B and is readily engaged by the second lowermost pallet of a stack of pallets advanced in the next cycle of operation.

During this period there may have been a third actuation of the pusher 22. Then in the last quarter of the cycle of operation the pusher bars 24 and 25 advance from right to left as shown in Fig. 2 of the drawing to engage respectively the articles on stripper plate 19 and the pallet therebeneath to push them collectively onto conveyor 11b as a completely assembled or loaded pallet.

While the foregoing discussion is believed to clearly bring out the interrelationship of the various moving parts of the apparatus, additional comment is considered desirable with respect to certain details of construction in the preferred form of apparatus. In Fig. 7 for example, a section through central super-structure 10 is shown to indicate now the various chain systems are carried in the super-structure. The upper portions of chains 22 slide along the lower flange of channel-irons 70 at the upper portion of super-structure 10, whereas lower portions of chains 22 travel in channels formed between ribs 71 welded to side plates 72 secured to upright channels 73. The ribs 71 act as stiffening members for the plates 72 and it will be noted that the plates also carry rollers 21 and stripper plate 19. Other plates 74 also secured to uprights 73 carry rollers 17 and 18 and are stiffened by means of angle-irons 75 welded thereto, the downwardly extending flanges 75a of which provide shoulders or guides for pallets moving on the rollers 17. The upper portions of the chains 23 ride on the angle-irons 75 and the lower portions of chains 23 ride in other angle-irons 76 secured to the uprights 73. It will also be noted that sprockets on rollers 17 and chain 53 for driving these rollers are shielded and protected by one of the angle-irons 75.

Fig. 8 shows a section through conveyor 11b indicating rollers 26 mounted directly in channel irons 77 by means of rods or axles 78 which pass through apertures 79 in said channel irons. Angle-irons 80 are secured to the channel irons to provide stop shoulders or guides for pallets moving on the rollers 26. One end of the roller 26 is provided with a sprocket 26a driven by a chain 26b, the same being substantially concealed by the angle-irons 80.

In Fig. 6 there is shown a sectional view indicating the drive mechanism for the rotary reciprocating alignment bars 16. Each of the bars 16 is provided with spaced bearings 16a engaging pins 81 carried by rotating arms 82 which are keyed to pins or drive shafts 83 and 83a. The drive shafts 83, 83a are mounted in casings 84, 84a and cross-channels 85, 85a secured to side channels 86 of conveyor 11a. The two drive shafts 83 are provided with sprockets or pulleys 87 and connected by a chain 88 and the two drive shafts 83a are similarly provided with sprockets 87a and chain 88a.

It will be apparent that the drive shafts 83 and 83a must rotate in opposite directions and the reverse drive is provided by a second drive shaft 89 carrying a gear 90 which meshes with a gear 91 on one of the shafts 83. The drive shaft 89 carries a drive pulley or sprocket 92 which is connected by belt or chain drive 93 to a motor M-3. Another sprocket 94 on drive shaft 89 is connected by belt or chain 95 to sprocket 96 on drive shaft 83a. It will thus be apparent that the motor M-3 in either its forward or reverse operation provides uniform and synchronize rotary reciprocating motion in the alignment bars 16.

Throughout the description reference has been made to roller conveyors. In this connection, however, it will be apparent that belt conveyors, or in some instances, reciprocating plate conveyors could be used as well. It will also be evident that the operations performed hydraulically in the apparatus as disclosed could also be performed by positive mechanical drive. For greater ease in operation using roller conveyors particularly when heavy articles are to be mounted, it may be advantageous to provide ball bearing mounts for the various rollers.

Various other changes and modifications in the apparatus as herein disclosed will occur to those skilled in the art and to the extent that such changes and modifications are embraced by the appended claims, it is to be understood that they constitute part of my invention.

I claim:

1. An automatic pallet loading apparatus comprising a central super-structure for assembly of pallets with articles to be loaded thereon, a pallet conveyor extending through said super-structure and protruding therebeyond to form at one side thereof an empty pallet aligning and delivery station and at the other side thereof a loaded pallet discharge station, a second conveyor entering said super-structure transversely of and above said pallet conveyor, a stripper plate disposed above said pallet conveyor in close proximity to pallets moving thereon, an inclined roller conveyor extending from said second named conveyor to said stripper plate, means for individually aligning and feeding pallets along said pallet conveyor to a point beneath said stripper plate, other means simultaneously transferring articles from said second named conveyor to said inclined conveyor and stripper plate, and cooperating means collectively engaging assembled articles on said stripper plate and the pallet disposed therebeneath to advance the same past said stripper plate while gradually depositing the articles on said pallet to form a loaded pallet.

2. An automatic pallet loading apparatus as defined in claim 1 wherein the central super-structure of said apparatus is provided with upper and lower chain systems each comprising a pair of movable endless chains arranged at opposed sides of said super-structure, and the last named means comprises pusher bars carried by said upper and lower chain systems.

3. An automatic pallet loading apparatus as defined in claim 2 wherein means is provided for varying the relative positions of the pusher bars in said upper and lower chain systems to thereby enable balanced loading of different size articles on pallets.

4. An automatic pallet loading apparatus as defined in claim 1 wherein the means for transferring pallets from said second named conveyor to said inclined conveyor comprises a pusher element pivotally mounted in said super-structure for swingable movement transversely of said second named conveyor.

5. An automatic pallet loading apparatus as defined in claim 1 wherein the means for aligning and feeding individual pallets to the apparatus includes in combination a reversibly driven conveyor, a vertically reciprocating lift-fork for lifting all but one of a stack of pallets in the forward movement of said conveyor and depositing all pallets in the reverse movement of said conveyor, and rotary reciprocating alignment bars paralleling both sides of said conveyor.

6. An automatic pallet loading apparatus as defined in claim 1 wherein the means for aligning and feeding individual pallets to the apparatus includes in combination a reversibly driven conveyor, a vertically reciprocating lift-fork for lifting all but one of a stack of pallets in the forward movement of said conveyor and depositing all pallets in the reverse movement of said conveyor, and rotary reciprocating alignment bars paralleling both sides of said conveyor, said alignment bars having a reversible synchronized drive such that movement of said bars when engaging and aligning a pallet is in the same direction as movement of said pallet.

7. An automatic pallet loading apparatus as defined in claim 1 wherein the means for aligning and feeding individual pallets to the apparatus includes in combination a reversibly driven conveyor, a vertically reciprocating lift-fork for lifting all but one of a stack of pallets in the forward movement of said conveyor and depositing all pallets in the reverse movement of said conveyor, rotary reciprocating alignment bars paralleling both sides of said conveyor, said fork-lift having two cycles of operation during one pallet loading cycle of the apparatus, and automatic means limiting downward movement of said fork-lift during one of its cycles to position the same for entry between the lowermost and next pallet in a stack of pallets.

8. An automatic pallet loading apparatus comprising a central super-structure for assembly of pallets with articles to be loaded thereon, a pallet conveyor extending through said super-structure and protruding therebeyond to form at one side thereof an empty pallet aligning and delivery station and at the other side thereof a loaded pallet discharge station, a second conveyor entering said super-structure transversely of and above said pallet conveyor, a stripper plate disposed above said pallet conveyor in close proximity to pallets moving thereon, an inclined roller conveyor extending from said second named conveyor to said stripper plate, means for individually aligning and feeding pallets along said pallet conveyor to a point beneath said stripper plate, said aligning and feeding means including in combination a reversibly driven portion of the pallet conveyor, a vertically reciprocating fork-lift for lifting all but one of a stack of pallets in the forward movement of said conveyor and depositing all pallets in the reverse movement of said conveyor, and rotary reciprocating alignment bars paralleling both sides of said conveyor, other means including a pusher element pivotally mounted in said super-structure for transferring articles from said second named conveyor to said inclined conveyor and stripper plate, the central super-structure of said apparatus being provided with upper and lower chain systems each comprising a pair of movable endless chains arranged at opposite sides of said super-structure, and pusher bars carried by said upper and lower chain systems for collectively engaging assembled articles on said stripper plate and the pallet disposed therebeneath to advance the same past said stripper plate while gradually depositing the articles on said pallet to form a loaded pallet.

9. An automatic pallet loading apparatus as defined in claim 8 wherein a first electric motor provides power for said upper and lower chain systems and hydraulic pressure is utilized to operate said fork-lift and pivoted pusher element, a second electric motor provides reversible power for the feed portion of said pallet conveyor, a third electric motor provides reversible power for said alignment bars, a fourth electric motor provides power for the article feed conveyor, and the operation of all of said motors is controlled by an automatic cam-timer which makes one complete cycle in each cycle of operation of said upper and lower chain systems.

10. An automatic pallet loading apparatus as defined in claim 9 wherein the automatic cam-timer also controls electric valves regulating operation of said fork-lift and pivoted pusher element, and a solenoid actuating positioning means is provided for said fork-lift.

11. An automatic pallet loading apparatus as defined in claim 9 wherein the circuit to said first electric motor during the latter portion of each cycle is carried through a number of load-check switches which act to automatically stop the apparatus if conditions are not right for completing a next cycle of the apparatus.

12. The method for loading articles on pallets that comprises delivering articles to a slightly inclined holding station while delivering and aligning a pallet beneath said station, engaging said articles and said pallet by separate pusher means for collectively advancing the same beyond said holding station to thereby gradually lower the articles onto said pallet, and selectively synchronizing the movement of said separate pusher means to deposit the articles in a predetermined position with respect to the leading edge and trailing edge of said pallet.

References Cited in the file of this patent
UNITED STATES PATENTS

| | | |
|---|---|---|
| 1,568,082 | Mitton | Jan. 5, 1926 |
| 2,442,250 | Spain | May 25, 1948 |
| 2,542,330 | Henderson et al. | Feb. 20, 1951 |
| 2,644,626 | Britt | July 7, 1953 |